(12) United States Patent
Capek

(10) Patent No.: US 7,000,934 B1
(45) Date of Patent: Feb. 21, 2006

(54) BICYCLE PROPULSION SYSTEM

(76) Inventor: William Capek, P.O. Box 73, Sparrowbush, NY (US) 12780

( * ) Notice: Subject to any disclaimer, the term of this patent is extended or adjusted under 35 U.S.C. 154(b) by 0 days.

(21) Appl. No.: 11/022,073

(22) Filed: Dec. 27, 2004

(51) Int. Cl.
*B62M 1/04* (2006.01)

(52) U.S. Cl. ........................................ 280/234; 280/240
(58) Field of Classification Search ................ 280/233, 280/234, 230, 263, 270
See application file for complete search history.

(56) References Cited

U.S. PATENT DOCUMENTS

| | | | | |
|---|---|---|---|---|
| 551,667 | A | * | 12/1895 | Dunn ........................ 280/234 |
| 3,895,825 | A | * | 7/1975 | Sink ........................... 280/234 |
| 5,775,708 | A | * | 7/1998 | Heath ......................... 280/234 |
| 6,032,970 | A | | 3/2000 | Porter |
| 6,105,985 | A | * | 8/2000 | Cosgrave .................... 280/248 |

* cited by examiner

*Primary Examiner*—Kevin Hurley
(74) *Attorney, Agent, or Firm*—Lilling & Lilling PC; Bruce E. Lilling; Sean Liam Kelleher

(57) ABSTRACT

The disclosure herein provides a two-wheel bicycle system wherein a pair of long levers are arranged on the cross-beam of the frame, to provide the fulcrum for the motion of the levers. The tops of the levers comprise handles perpendicular to such levers, with linkages to a circular and rotatable crank, which rotates in a plane parallel to the ground about a column commonly found in the steering mechanism for such a bicycle. The bottom ends of the levers connect to linking members to connect such levers to the pedals commonly found in such a bicycle. Such linking members are provided so that they are disconnected and then rotatable to be mounted on the diagonal frame piece of the bicycle, when the bicycle is used with hand-operated steering and foot-operated power. Before disconnection, only upper body energy is used to control both steering and powering the bicycle.

4 Claims, 4 Drawing Sheets

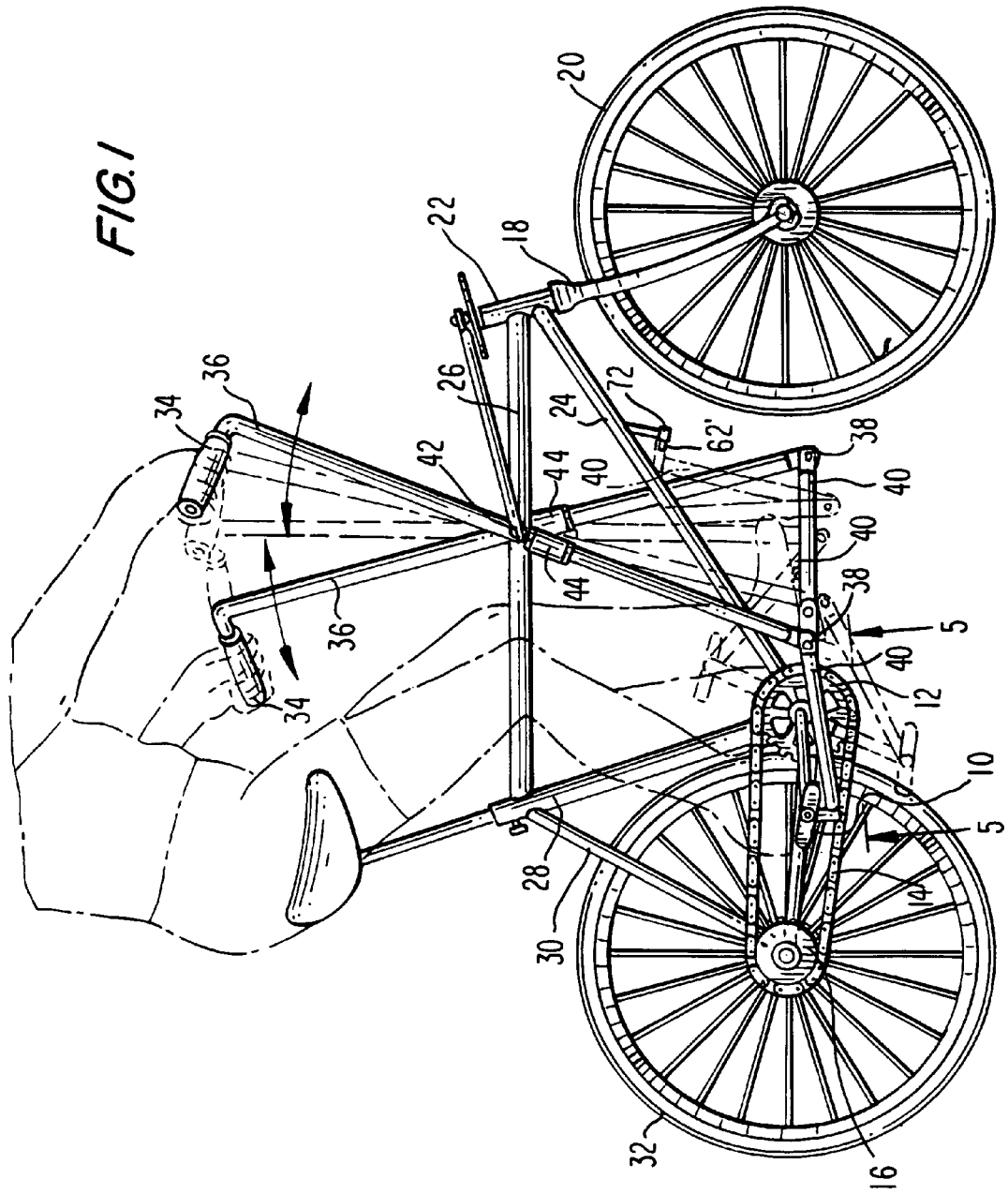

BICYCLE PROPULSION SYSTEM

FIELD OF THE INVENTION

This invention relates primarily to two-wheel bicycle designs, and more particularly to a bicycle and link design that enables upper body motion to both propel and to steer the bike; and yet, with a simple disconnect and storage mounting of a link element, the overall design is restored so that the bike is steered with the upper body and propelled by the lower body of the user.

BACKGROUND OF THE INVENTION

Bike riding, for many years, has been used for providing play value to a youngster, but also for providing exercise to both youngsters and oldsters. One drawback of the usual bicycle linkages relates to the fact that with such linkages, the primary exercise is provided to the lower part of the rider's body. In other words, a much lesser amount of exercise is provided to the arms, as compared to the legs.

Attempts have been made to more evenly distribute the arms/legs exercise.

More even distribution of arms/legs exercise has been attempted in U.S. Pat. No. 6,032,970, to Porter issued on Mar. 7, 2000. Unlike the present invention, the steering mechanism in the Porter patent operates with the handlebar levers mounted on the diagonal fork of the bicycle, whereby direct twisting of such levers turn the front wheels in a steering motion. The present invention more positively applies the steering force by use of the arms of the user, which translates through a rotating disk, at the top of the fork, rotatable to steer the bicycle. Furthermore, the present invention handlebars, similar to Porter, form the top of the hand and arm driven power levers, to propel the bicycle through a linkage to the power levers to the conventional pedals of the bicycle. The present invention also uses a linkage to propel the bicycle, which is far less complex than that used by Porter, and presents a mechanism less likely to have the feet or the pants becoming fowled between the pedal crank and the linkage. Still further, the mechanism of the present invention has a simpler disconnect system than that of Porter, and enables mounting of the disconnected linkage after disconnect restores the bicycle to conventional upper body steering and lower body propulsion.

OBJECTS AND SUMMARY OF THE INVENTION

Accordingly, a primary object of the present invention is to provide a bicycle mechanism that enables upper body steering and propulsion, wherein the steering mechanism enables a reliable and positive force for steering the bicycle to conventional usage, and yet a non-fowling structure for the lower body of the user after disconnect.

A further object of the present invention is to provide a structure and mechanism for such a bicycle, wherein, after disconnect, the disconnected elements of the mechanism are mounted on the frame of the bicycle for convenient usage of the bicycle in a conventional manner.

These and other objects of the present invention are provided in a structure and mechanism for a bicycle which features basic elements of a conventional two-wheel bicycle, such as a pair of pedals mounted through a sprocket to the rear wheel of the bicycle, a diagonal frame piece, a horizontal frame piece and a steering fork for the front wheel. Mounted atop the steering fork is a rotatable circular steering disk, steering links, rotatably attached to the disk, and at the other ends of the steering links, conventional handles are attached so that a rotating motion of the handles turns the disk and thereby steers the front wheel of the bicycle. At the other ends of the levers mounting the handles, power links are provided and connected to the pedals of the bicycle, with a disconnecting capability. The levers are provided with a fulcrum at approximately their midpoints on the horizontal frame piece, where the levers are split approximately in half to enable a steering motion by twisting the handles. Such a split enables the use of a collar to isolate the steering motion.

Power is translated from upper body tilting motion of the levers, using the midpoint fulcrum, to the pedals for powering the bicycle by use of the upper body; namely, by back-and-forth motion of the arms of the user, to tilt the levers back and forth.

The link between the bottom of the levers and the pedal is disconnectible from the pedals and rotatable to a point whereby such links are mounted out of the way for converting the bicycle to conventional use of upper body steering and lower body powering of the rear wheels.

BRIEF DESCRIPTION OF THE DRAWINGS

Other objects, features and advantages of the present invention will become apparent by the following more detailed description of the preferred, but nonetheless illustrative, embodiment of the present invention, with reference to the accompanying drawings, wherein:

FIG. 1 is a side view of a bicycle structure and design according to the present invention;

DETAILED DESCRIPTION OF THE PREFERRED EMBODIMENT

Figure 4:
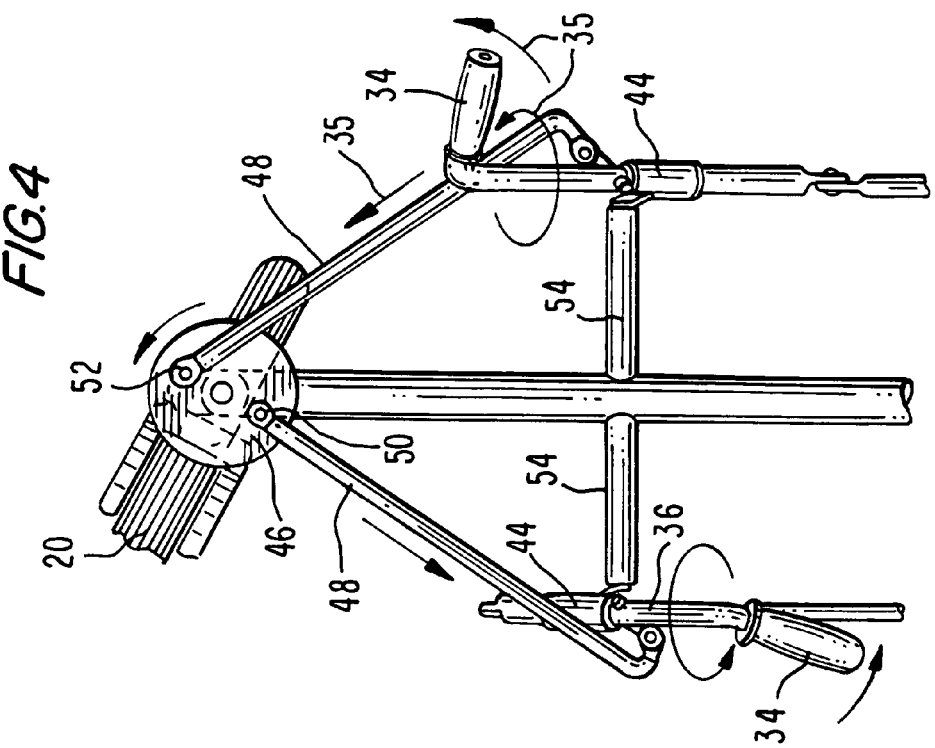
FIG. 4 is a top view of the handles and other steering structure, similar to the view shown in FIG. 2, but illustrating the mechanism as it operates during a turning portion of the front wheel.

Referring to the drawings, and particularly FIG. 1 thereof, the elements of a typical two-wheel bicycle design are shown. Pedals 10 are used to power the bicycle by connection to sprocket 12 which mounts chain 14 to rear wheel sprocket 16, and for operation in the conventional manner for two-wheel bicycles. A steering fork 18 is mounted astride the center of the front wheel 20 for steering by motion within the tube 22 at the top of fork 18. The conventional and the present invention bicycles also have a diagonal frame piece 24 and horizontal frame piece 26, with seat mount frame piece 28 and the rotatable frame piece 30, rotatably connected to rear wheel 32. Handles 34 are also provided, but in the present invention connected to levers 36, and at the top thereof. Such levers at the bottom ends thereof are connected by swivel joints 38 to power links 40. Such power links 40 are formed and arranged to connect and disconnect from pedals 10, as will be described hereinafter with reference to FIGS. 5 and 6.

Figure 2:
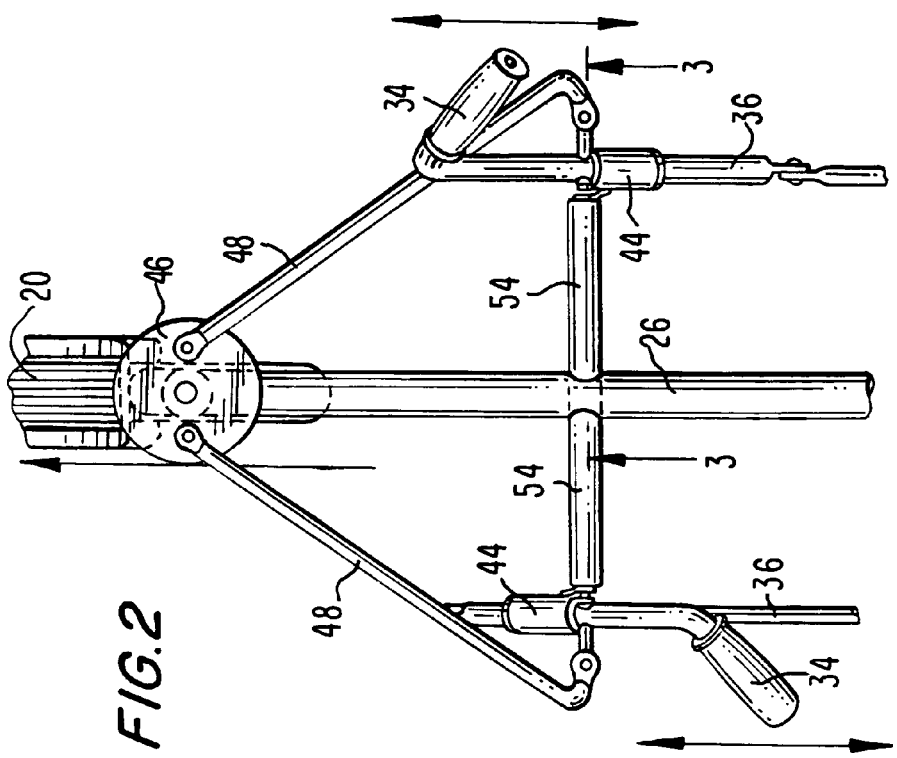
FIG. 2 is a top view of the steering mechanism, which uses a rotating disk mounted on the top of the steering fork of the bicycle.
Figure 3:
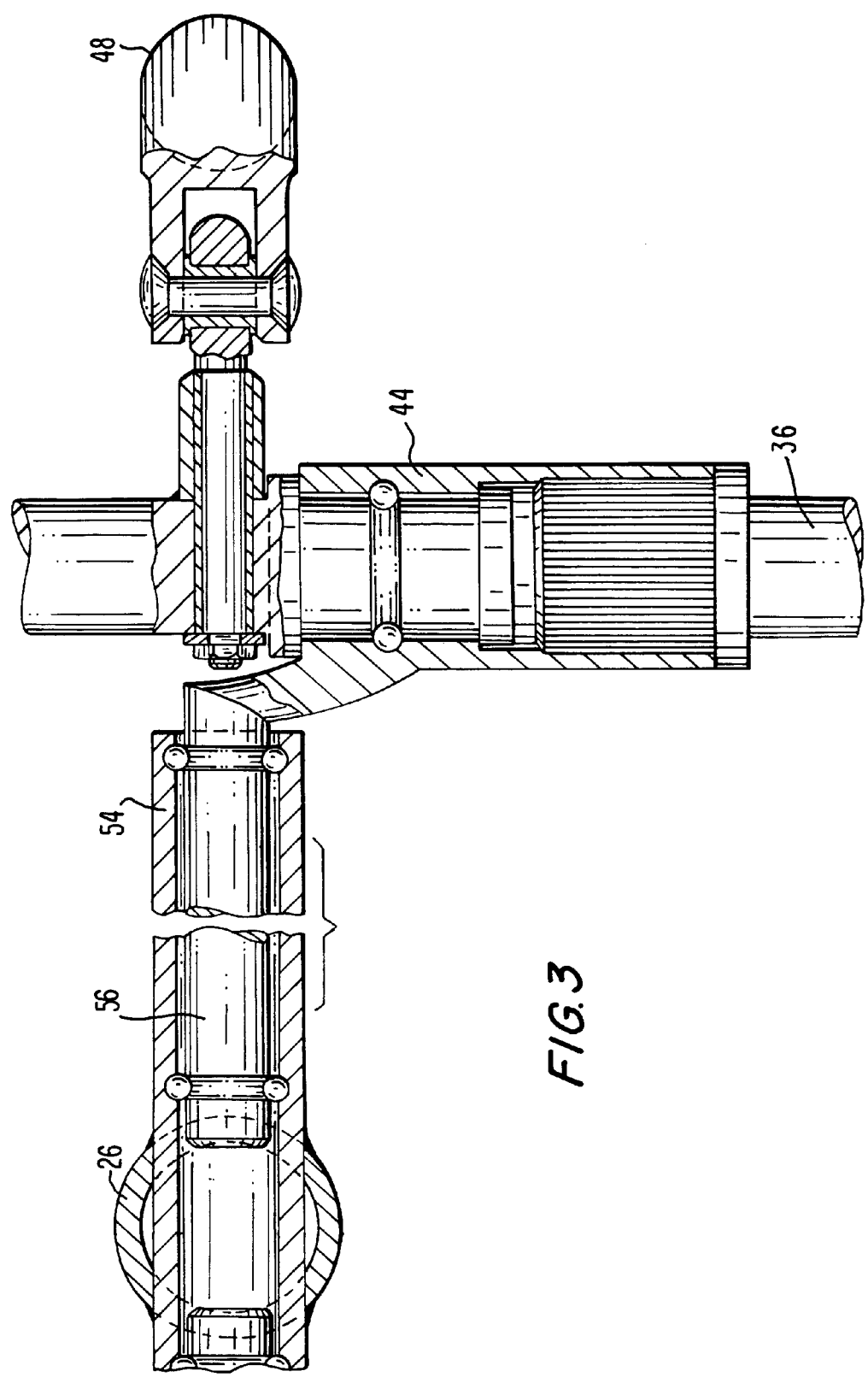
FIG. 3 is a sectional view of a mechanism for one of the handles of the bicycle, showing in detail its mechanism and the structure thereof, taken along the line 3—3 of FIG. 2.

The midpoint of levers 36 are mounted on fulcrum element 42, with sleeves 44 thereby, to enable steering of the bicycle, and particularly the front wheel 20 thereof, with the mechanism shown in FIGS. 2, 3 and 4.

Referring to FIGS. 2–4, rotatable circular disk 46 is the novel and key element to a simpler and more positive steering capability for a bicycle according to the present invention. Disk 46 is mounted above the rotating top of fork 18, within tube 22, with steering links 48 rotatably attached to disk 46, respectively, at points 50 and 52. FIGS. 2–4 also show other frame pieces, cross-frame pieces 54, which extend from horizontal frame pieces 26, to brace the steering mechanism. The structure most clearly shown in FIG. 3, shows the particular mounting of lever 36, rotatable in a horizontal plane to affect the steering (shown best in FIGS. 2 and 4), and yet to enable the push-pull motion of lever 36 (rotation motion of lever 36) by rotation within cross-frame piece 54 of solid tube 56. Stated another way, the cross-frame piece 54 remains stationary while the push-pull motion of lever 36 occurs. In other words, the rotation of handles 34 (FIG. 4) in directions indicated by arrows 35 performs a left turn of the bicycle; whereas the push-pull of levers 36, using handles 34, propels the bicycle through links 40, in a locomotive-style linkage, well known in terms of rotating sprocket 12.

Figure 5:
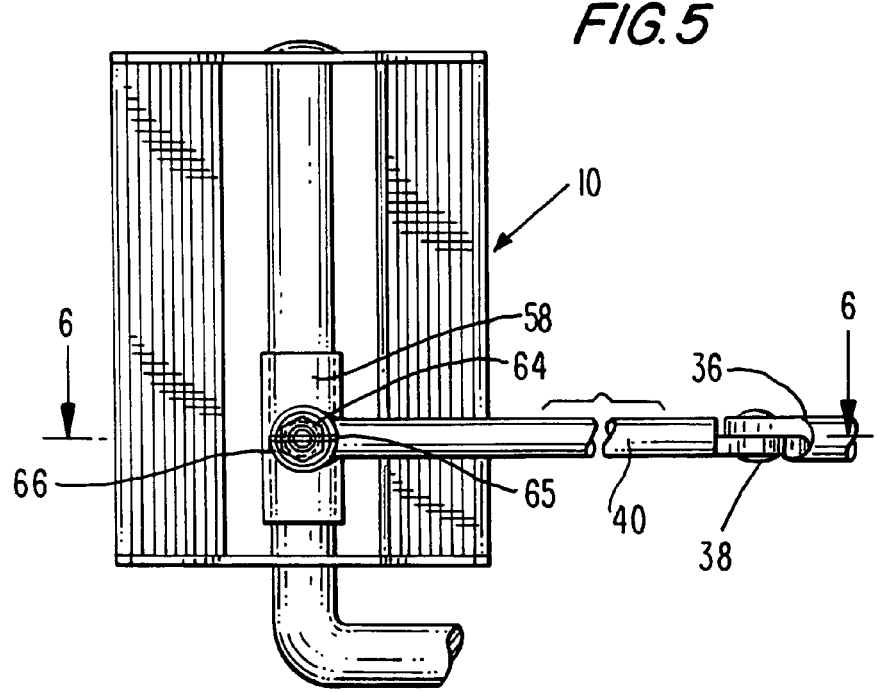
FIGS. 5 and 6 are partial and sectional views taken, respectively, along the line 5—5 of FIG. 1, and along the line 6—6 of FIG. 5, and showing particularly the pedal construction and the attachment of the power link to a pedal of the bicycle, and also showing the rotation of the power link for mounting after disconnection of the power link from the pedal.
Figure 6:
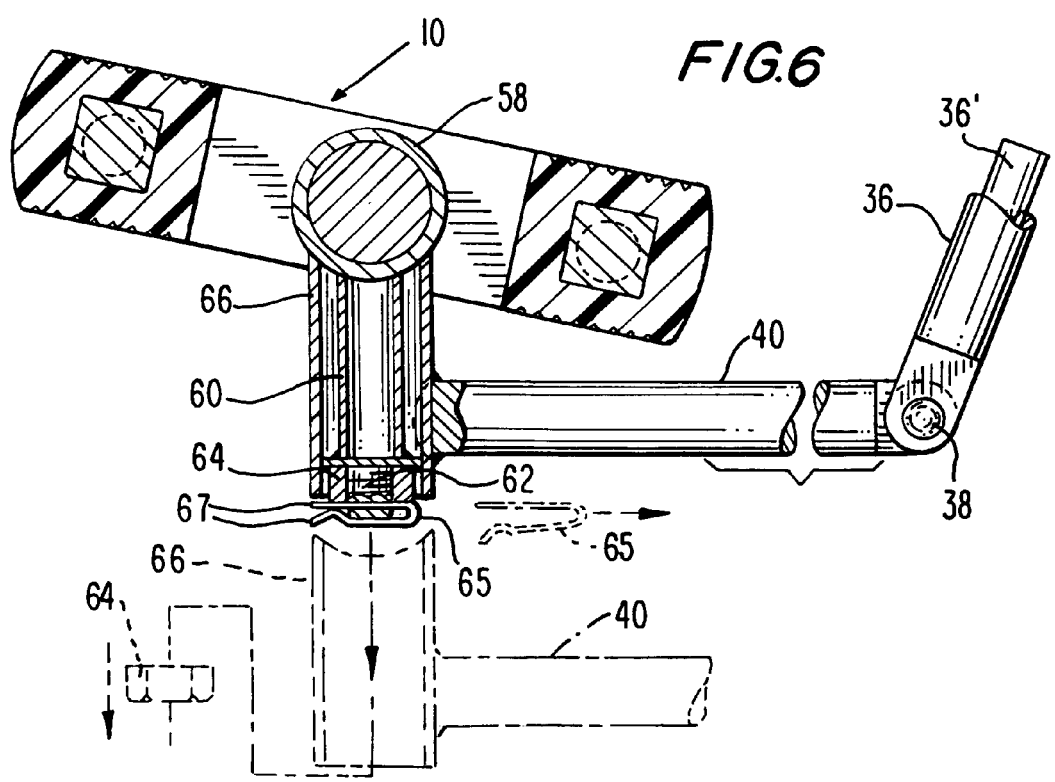

Referring particularly to FIGS. 1, 5 and 6, the locomotive-type propulsion is enabled by the connections shown for pedals 10, and in the same manner as foot propulsion would cause power to be translated to rotating rear wheel 32. Using levers 36 (upper body push-pull motion), the connection is made by links 40 to pedals 10 by means of a rotatable sleeve 58 on the middle rung of each pedal 10. Downwardly depending from each sleeve 58 (FIG. 6) is a tube 60, from which depends a threaded stud 62. Threaded stud 62 and its associated nut 64 are used to secure a cup element 66, to which is attached link 40, which has at its other end from the pedal 10, a swivel joint 38. Also near the swivel joint, but on lever 36, the structure includes a bushing mechanism 36' for enabling the rotation of handles 34, without the various connections of levers 36 (e.g. swivel 38) restricting the rotating motion.

Further securement, particularly to further prevent nut 64 from unintentionally unthreading, is a pin 65 with separable ends 67, the pin placed on stud 62, outside of nut 64, to prevent unintentional unthreading of the nut from the stud. To move from upper body power to conventional pedal power, the pin is removed and nut 64 is unthreaded. When converting to pedal power (lower body power), nut 64 can either be held by the bicycle user or rethreaded onto stud 62. After disconnection of links 40, FIG. 1 shows a structure 72, which, after disconnection, grasps cup element 66 onto diagonal frame piece 24 of the bicycle. In other words, structure 72 includes a stud 62', which is encircled by cup element 66, after which another nut 64' (not shown) is threaded thereon, and pin 65 is placed outside of nut 64' on threaded stud 62', as is shown in FIG. 1, with ghost lines for link 40, after rotation using swivel 38. Actually, there would be two such mounting structures 72 on diagonal frame piece 24 to receive the disconnected cup elements 66, after conversion is made to lower body power with respect to pedals 10. This motion after disconnect to secure link 40, is enabled by the swiveling motion of swivel joint 38 (FIG. 6).

All in all, it may then be seen that the objectives of the present invention are satisfied. Power is provided to rear wheel 32 by either upper body, push-pull motion of levers 36; or provided by conventional pedal motion (lower body power). In any event, it may also be seen that the mechanism as shown provides for the mounting of links 40 in an out-of-the-way place so as not to present a possible fowling of the user's feet or pants during pedaling.

Although the foregoing provides a complete and detailed description of a preferred and illustrative structure, the present invention is only limited by the following claims.

What is claimed is:

1. A two-wheel bicycle structure for upper body propulsion and steering and for upper body steering with lower body propulsion, said bicycle having front and rear wheels, first and second sprockets with a chain encircling said sprockets, a pair of pedals connected to said first sprocket at the center thereof, a horizontal frame piece, a diagonal frame piece, a steering fork, having a tube attached at the top of said fork, said fork being rotatable relative to said tube, a front wheel having a center hub, said steering fork mounted astride said center hub and said tube being fixedly attached to said diagonal frame piece, and said horizontal frame piece, comprising:
    (a) a pair of elongated push-pull levers for oscillating in planes perpendicular to the ground, each of said levers terminating at its uppermost end in a handle, at its lower end in swivel joints, and, at approximately its midpoint, connected for push-pull operation to a fulcrum point on said horizontal frame piece; and
    (b) a disk at the uppermost end of said fork and fixedly attached to said fork, a pair of elongated steering links rotatably attached at their first ends to said disk at the opposed sides thereof approximately 180 degrees apart, said steering links at the second ends thereof being linked to said handles, whereby twisting motion of said handles causes said front wheel to turn in a manner to cause said bicycle to turn.

2. A bicycle according to claim 1 wherein each of said swivel joints also connects to an elongated power link having first and second ends, said power link rigidly connectible at its second end to one of said pedals, so that said first sprocket is turned with the push-pull operation of said levers.

3. A bicycle according to claim 2 wherein said power links are disconnectible from said pedals.

4. A bicycle according to claim 3 wherein said diagonal frame piece includes a mounting structure for mounting said second ends of said power links when they are disconnected.

* * * * *